United States Patent
Noh et al.

(10) Patent No.: US 8,212,827 B2
(45) Date of Patent: Jul. 3, 2012

(54) MODE CONVERSION METHOD AND DISPLAY APPARATUS USING THE SAME

(75) Inventors: Young-joong Noh, Suwon-si (KR); Byung-jin Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 811 days.

(21) Appl. No.: 12/170,106

(22) Filed: Jul. 9, 2008

(65) Prior Publication Data
US 2009/0225091 A1 Sep. 10, 2009

(30) Foreign Application Priority Data
Mar. 4, 2008 (KR) .................. 10-2008-0020043

(51) Int. Cl.
*G06F 13/14* (2006.01)
*G06F 3/038* (2006.01)
*G06T 1/00* (2006.01)
*G09G 3/18* (2006.01)
(52) U.S. Cl. ......... 345/520; 345/522; 345/3.1; 345/211; 345/52
(58) Field of Classification Search .............. 345/520, 345/522, 3.1, 211, 52
See application file for complete search history.

(56) References Cited

U.S. PATENT DOCUMENTS

| | | | |
|---|---|---|---|
| 5,382,982 A | 1/1995 | Enomoto | |
| 5,432,561 A | 7/1995 | Strubbe | |
| 6,239,845 B1 * | 5/2001 | Itagaki et al. | 348/552 |
| 6,326,935 B1 * | 12/2001 | Boger | 345/3.2 |
| 6,593,975 B1 | 7/2003 | Oh | |
| 7,173,613 B2 * | 2/2007 | Greenwood et al. | 345/211 |
| 2003/0142955 A1 * | 7/2003 | Hashizume et al. | 386/52 |
| 2006/0221254 A1 | 10/2006 | Chang | |

OTHER PUBLICATIONS

Extended European Search Report issued on Nov. 2, 2010 in counterpart European Application No. 08171307.5.

* cited by examiner

Primary Examiner — Hau Nguyen
(74) Attorney, Agent, or Firm — Sughrue Mion, PLLC (57) ABSTRACT

Mode conversion methods and display apparatuses thereof are provided. The method converts to a second mode in which the display apparatus displays an image inputted from a second source, if there is no input of an image signal from a first source during the display apparatus operates in a first mode in which the display apparatus displays the image inputted from the first source. According to the present invention, it is possible to convert a mode automatically based on the external input status. A user may be provided two modes conveniently using the conversion method.

14 Claims, 10 Drawing Sheets

MODE CONVERSION METHOD AND DISPLAY APPARATUS USING THE SAME

CROSS-REFERENCE TO RELATED APPLICATIONS

This application claims benefit of Korean Patent Application No. 10-2008-0020043, filed Mar. 4, 2008, the disclosures of which are incorporated herein in its entirety by reference.

BACKGROUND OF THE INVENTION

1. Field of the Invention

Methods and devices consistent with the present invention relate to a display apparatus, and more particularly to a display apparatus such as a TV or a monitor, which provides a displayed image to a user.

2. Description of the Prior Art

Recent trend toward a big screen TV makes it possible to watch an image reproduced from external image apparatuses, using a big screen.

Not only a mobile apparatus which has its own display but also a Personal Computer (PC) is included in the external image apparatuses. More users use the big screen on the TV to watch a movie or a picture in the PC or to do web surfing. According to the trend, TV performs not only a function of receiving a broadcast conventionally but also a function of a monitor in a PC. The era that only a monitor displays an image received from a PC is gone.

According to the trend that a TV performs a function as a monitor adding to the function of receiving a broadcast, the method for a user to use the two functions of a TV conveniently and harmoniously is required.

SUMMARY OF THE INVENTION

An aspect of the present invention is to provide mode conversion methods and display apparatuses therefore which is able to convert a mode automatically based on an external input status through external input units.

According to an aspect of the invention, there is provided a mode conversion method of a display apparatus comprising determining whether there is input of an image signal from a first source continuously during the display apparatus operation in a first mode in which the display apparatus displays the image inputted from the first source, and converting to a second mode in which the display apparatus displays an image inputted from a second source if there is no input of the image signal from the first source. The converting in the mode conversion method may be performed automatically without a user's input to command conversion to the second mode. The first source may be a personal computer (PC) and there is no input of the image signal from the first source if there is input of an image signal which does not have a synchronizing signal according to the Display Power Management Signaling (DPMS) function of the PC. The second source may be one of a source a user selects among sources which are able to provide an image signal and a source providing a broadcasting image signal.

According to an aspect of the invention, there is provided a mode conversion method of a display apparatus comprising determining whether there is input of an image signal from a first source during the display apparatus operation in a second mode in which the display apparatus displays an image input from a second source, and converting to a first mode in which the display apparatus displays the image input from the first source if there is input of the image signal from the first source. The mode conversion method of a display apparatus may comprises determining whether there is input of an image signal from a first source during the display apparatus operation in a second mode in which the display apparatus displays an image input from a second source, and converting to a mode in which the display apparatus displays the image input from the first source and the image input from the second source together if there is input of the image signal from the first source. The first source may be a personal computer (PC) and there is input of the image signal from the first source if the PC which is turned on already is connected to the display apparatus or the PC which is connected to the display apparatus already is turned on.

According to an aspect of the invention, there is provided a display apparatus comprising a display unit which displays an image, and a control unit which determines whether there is input of an image signal from a first source continuously during display apparatus operation in a first mode in which the display apparatus displays the image input from the first source, and converts to a second mode in which the display apparatus displays an image input from a second source if there is no input of the image signal from the first source. The control unit may convert to the second mode automatically without a user's input to command conversion to the second mode. The first source may be a personal computer (PC) and there is no input of the image signal from the first source if there is input of an image signal which does not have a synchronizing signal according to the Display Power Management Signaling (DPMS) function of the PC. The second source may be one of a source a user selects among sources which are able to provide an image signal and a source providing a broadcasting image signal.

According to an aspect of the invention, there is provided a display apparatus comprising a display unit which displays an image, and a control unit which determines whether there is input of an image signal from a first source during display apparatus operation in a second mode in which the display apparatus displays an image input from a second source, and converts to a first mode in which the display apparatus displays the image input from the first source if there is input of the image signal from the first source. The display apparatus may comprise a display unit which displays an image, and a control unit which determines whether there is input of an image signal from a first source during the display apparatus operation in a second mode in which the display apparatus displays an image input from a second source, and converts to a mode in which the display apparatus displays the image input from the first source and the image input from the second source together if there is input of the image signal from the first source. The first source may be a personal computer (PC) and there is input of the image signal from the first source if the PC which is turned on already is connected to the display apparatus or the PC which is connected to the display apparatus already is turned on.

According to an aspect of the invention, there is provided a display apparatus comprising external input units which receive image signals from external sources, a memory which stores a final mode which is a mode at the time when the display apparatus turned off last time, a GUI generating unit, a display unit which displays an image, and a control unit which controls the display unit to operate in a personal computer (PC) mode that is a mode which displays an image received from a PC through one of the external input units, if the final mode is the PC mode and there is input of the PC image signal. The control unit may check whether there is an input signal through the other external input units than the external input unit connected to the PC and controls the GUI generating unit to generate a mode selection list which shows the list of the external input units which receives the input signal, if the final mode is the PC mode and there is no input of the PC image signal. The control unit may control the GUI generating unit to generate a message asking whether a user want a PC mode, if the final mode is not the PC mode and there is input of the PC image signal. The control unit may control the display unit to operate in the final mode, if the final mode is not the PC mode and there is no input of the PC image signal or the user responds negative answer to the message.

BRIEF DESCRIPTION OF THE DRAWINGS

The above and other aspect and features of the present invention will be apparent from the following detailed description taken in conjunction with the accompanying drawings, in which.

DETAILED DESCRIPTION OF EXEMPLARY EMBODIMENTS OF THE INVENTION

Hereinafter, exemplary embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are merely specific details provided to assist those of ordinary skill in the art in a comprehensive understanding of the invention, and the present invention is only defined within the scope of the appended claims.

Figure 1:
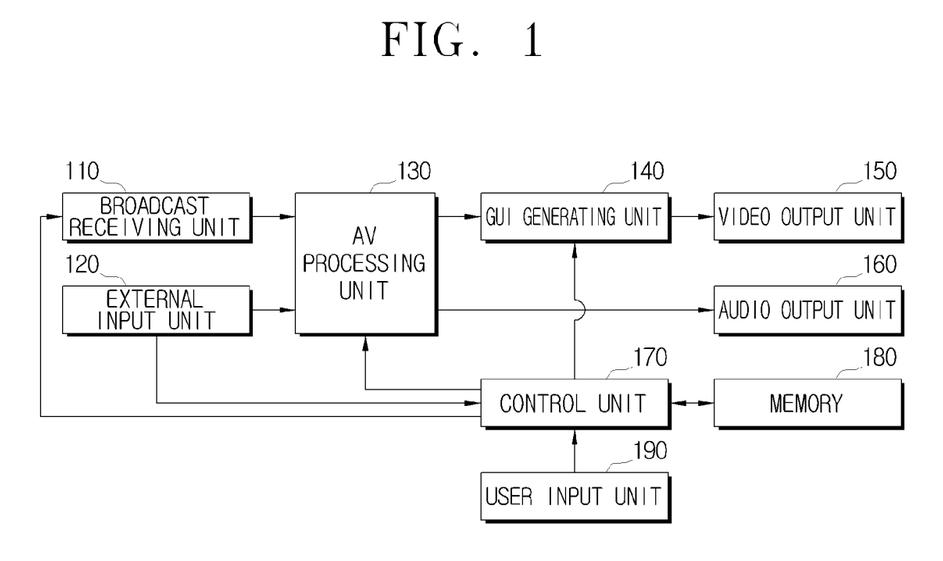
FIG. 1 is a block diagram of a Digital TV (DTV) according to an exemplary embodiment of the present invention.

FIG. 1 is a block diagram of a Digital TV (DTV) according to an exemplary embodiment of the present invention. The DTV may be connected to a Personal Computer (PC) and may convert a mode automatically according to existence of an image received from the PC.

Referring to FIG. 1, the DTV according to an exemplary embodiment of the present invention includes a broadcast receiving unit 110, an external input unit 120, an AV processing unit 130, a Graphic User Interface (GUI) generating unit 140, a video output unit 150, an audio output unit 160, a control unit 170, a memory 180, and a user input unit 190.

The broadcast receiving unit 110 receives a broadcasting signal from a broadcasting station or a satellite by a cable or wireless transmission and demodulates the signal.

The external input unit 120 is connected to an external device such as a Digital Versatile Disk (DVD) player, a Divx player, and a PC and receives an external input signal from the external device. The external input unit 120 has terminals for connecting to the external device, for example, a composite terminal, a component terminal, a D-sub terminal, and a High Definition Multimedia Interface (HDMI) terminal.

The AV processing unit 130 performs signal processing such as video decoding, video scaling, and audio decoding for the broadcasting signal received through the broadcast receiving unit 100 and the external input signal received through the external input unit 120. The AV processing unit 130 sends a video signal to the GUI generating unit 140 and an audio signal to the audio output unit 160.

The GUI generating unit 140 generates a GUI to be displayed on a display and adds the generated GUI to the video signal output from the AV processing unit 130. The control unit 170 controls a GUI generating operation of the GUI generating unit 140.

The video output unit 150 displays the video to which the GUI generated by the GUI generating unit 140 is added on the display. The audio output unit 160 outputs the audio output from the AV processing unit 130 through a speaker.

The control unit 170 controls overall operations of the DTV according to a user's manipulation input through the user input unit 190. The user input unit 190 comprises various kinds of manipulation means provided in the exterior of the DTV and a light sensor which receives a user's command from a remote controller and sends the user's command to the control unit 170.

The memory 180 stores software programs and data which is needed for the control unit 170 to control the operations of the DTV. There is a mode data which is needed to control the operations of the DTV. The mode data includes information of a final mode which is a mode at the time when the DTV turns off.

The control unit 170 determines whether the D-sub terminal provided in the external input unit 120 receives a normal image signal from the PC. If the image signal received from the PC has both a Horizontal Synchronizing signal (H-Sync) and a Vertical Synchronizing signal (V-Sync), it is a normal image signal. If the image signal received from the PC does not have any one of the H-Sync and the V-Sync, it is considered to be an abnormal image signal. If the abnormal image signal is received, an image signal is not regarded as having been received from the PC. If the image signal received from the PC doesn't have any one of the H-Sync and the V-Sync according to the Display Power Management Signaling (DPMS) function of PC, an image signal is not regarded as having been received from the PC. The control unit 170 may convert a mode of the DTV automatically based on whether the D-sub terminal receives an image signal from the PC. This will be explained in detail referring to FIG. 2.

Figure 2:
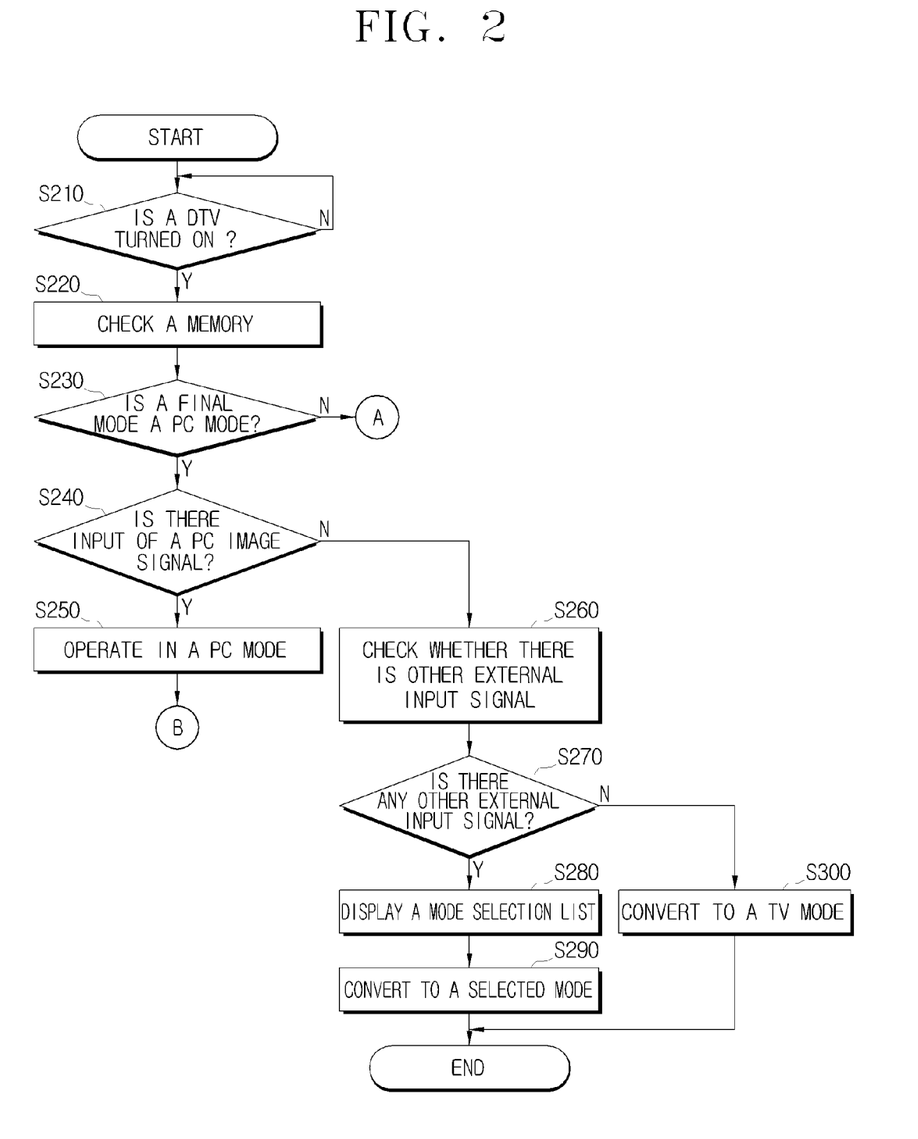
FIG. 2 is a flow chart of a mode conversion method in the DTV illustrated in FIG. 1.

FIG. 2 is a flow chart of a mode conversion method in the DTV illustrated in FIG. 1.

Referring to FIG. 2, if the DTV is turned on S210-Y, the control unit 170 checks the memory 180 S220. When the control unit 170 checks the memory 180, the control unit 170 reads data including a mode data, which is stored in the memory 180 and may recognize what is the final mode of the DTV using the mode data.

A PC mode is a mode wherein a PC image signal received from a PC which is connected to a terminal of the external input unit 120, is displayed on the DTV. If the final mode is the PC mode S230-Y, the control unit 170 determines whether the external input unit 120 receives the PC image signal S240.

In the S240, the control unit 170 determines whether the external input unit 120 receives the PC image signal according to whether the D-sub terminal of the external input unit 120 receives the PC image signal comprising H-Sync and V-Sync.

Figure 3A:
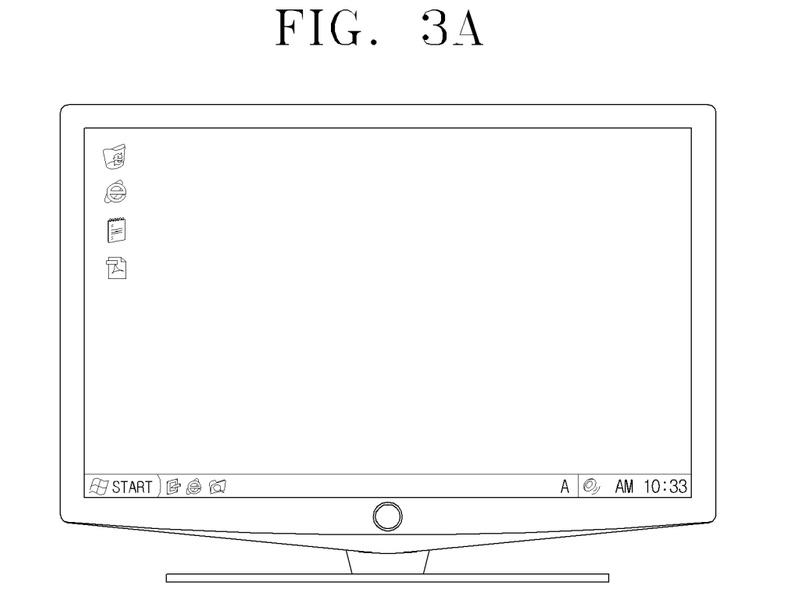
FIG. 3A to 3E are illustrations which show the mode conversion method in FIG. 2.

If the external input unit 120 receives the PC image signal S240-Y, the control unit 170 controls the DTV to operate in the PC mode S250. In detail, the control unit 170 controls the AV processing unit 130 to process the PC image signal input to the external input unit 120 and controls the video output unit 150 and the audio output unit 160 to output a PC image and sound. FIG. 3A illustrates the DTV performed the operation S250.

If the external input unit 120 does not receive the PC image signal S240-N, the control unit 170 checks whether there is other external input to the external input unit 120 S260. For example, the control unit 170 checks whether there is an external signal inputted through other external terminals such as a composite terminal, a component terminal, and HDMI terminal, if there is no external signal inputted through the D-sub terminal from the PC.

If there is an external signal inputted through other external terminals S270-Y, the control unit 170 makes a mode selection list based on the result of check in operation S260 and controls the GUI generating unit 140 to make a GUI for the mode selection list S280.

Figure 3B:
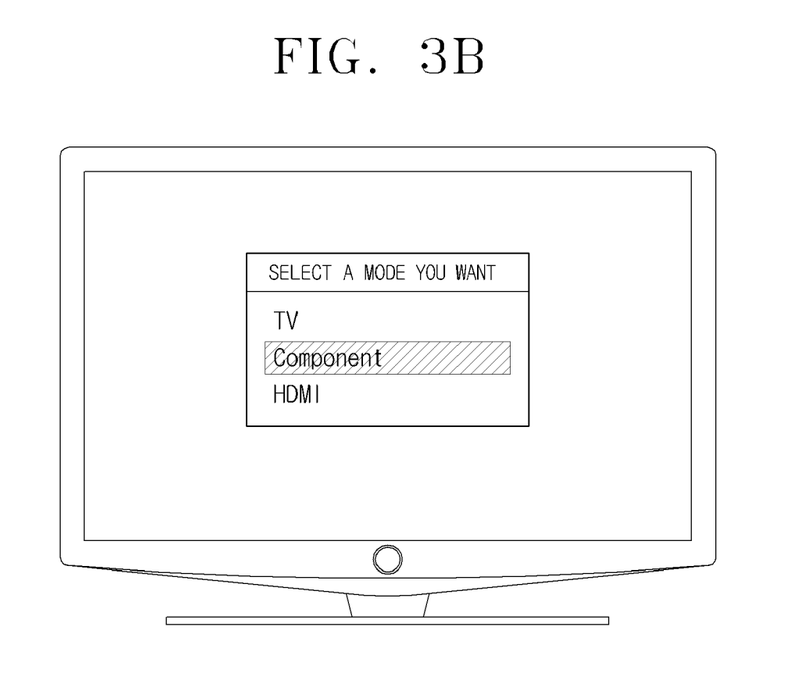

The mode selection list includes all the modes which a user can select. TV and names of terminals which receives an external signal are included in the list. FIG. 3B illustrates an example of a mode selection list. A user can select one of all the modes in the mode selection list illustrated in FIG. 3B using the user input unit 190.

Figure 3C:
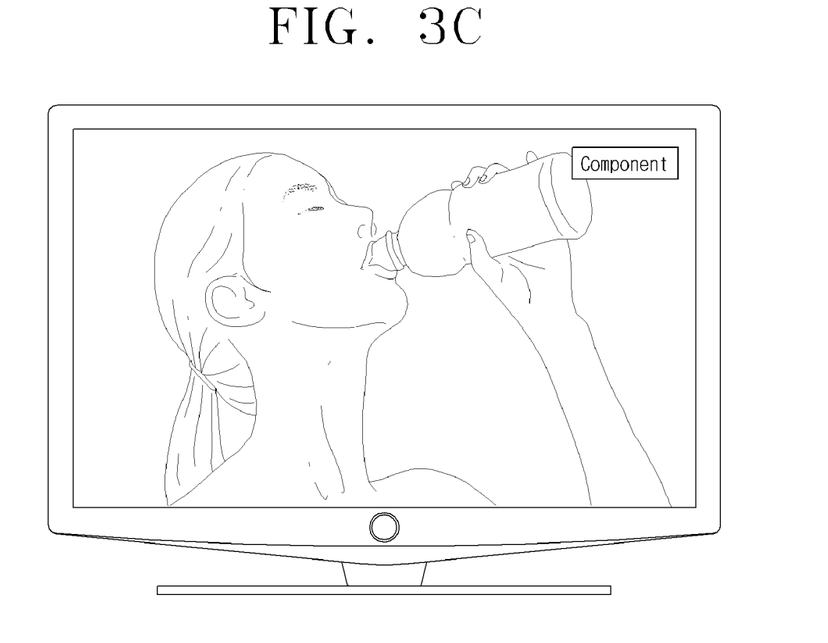

The control unit 170 controls the DTV to convert its mode to the mode selected by a user S290. FIG. 3C illustrates the DTV which performs operation S290, if a user selects a component mode.

Figure 3D:
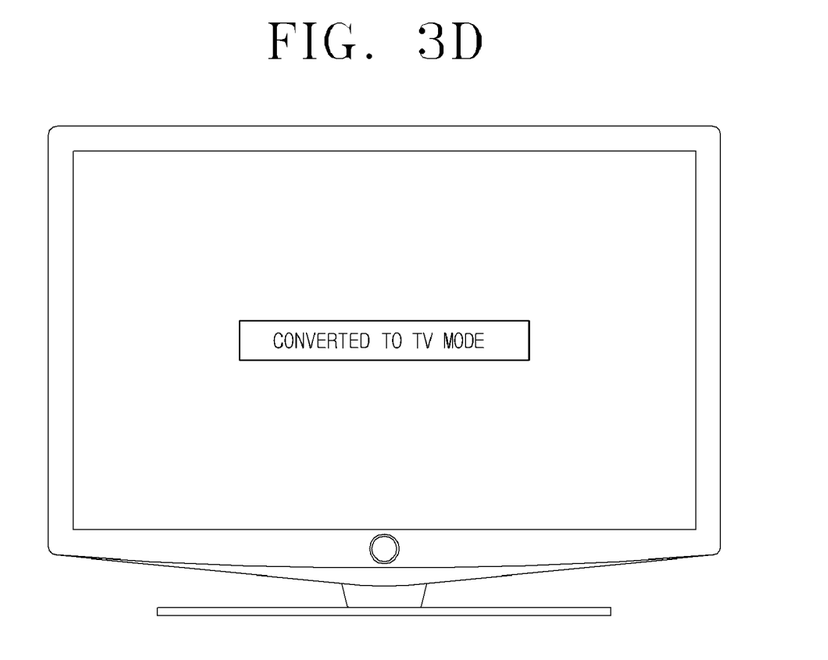

If there is no external signal input through other external terminals S270-N, the control unit 170 controls the DTV to convert to the TV mode S300. The control unit 170 updates the information of a final mode in the mode data stored in the memory 180 from PC mode to TV mode. The control unit 170 controls the GUI generating unit 140 to display a message that says 'converted to TV mode'. The DTV displays the message illustrated in FIG. 3D.

Figure 3E:
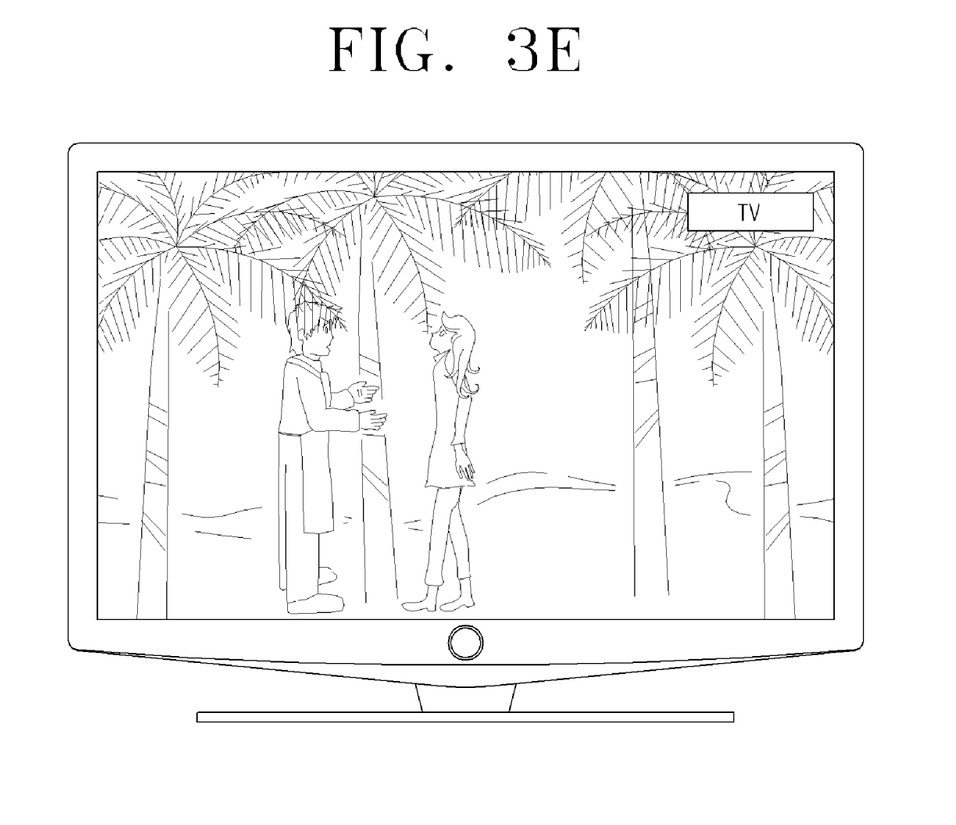

The control unit 170 controls the AV processing unit 130 to process the broadcasting signal received at the broadcast receiving unit 110 and controls the video output unit 150 and the audio output unit 160 to output a broadcasting image and sound. FIG. 3E illustrates the DTV which displays the broadcasting image.

Figure 4:
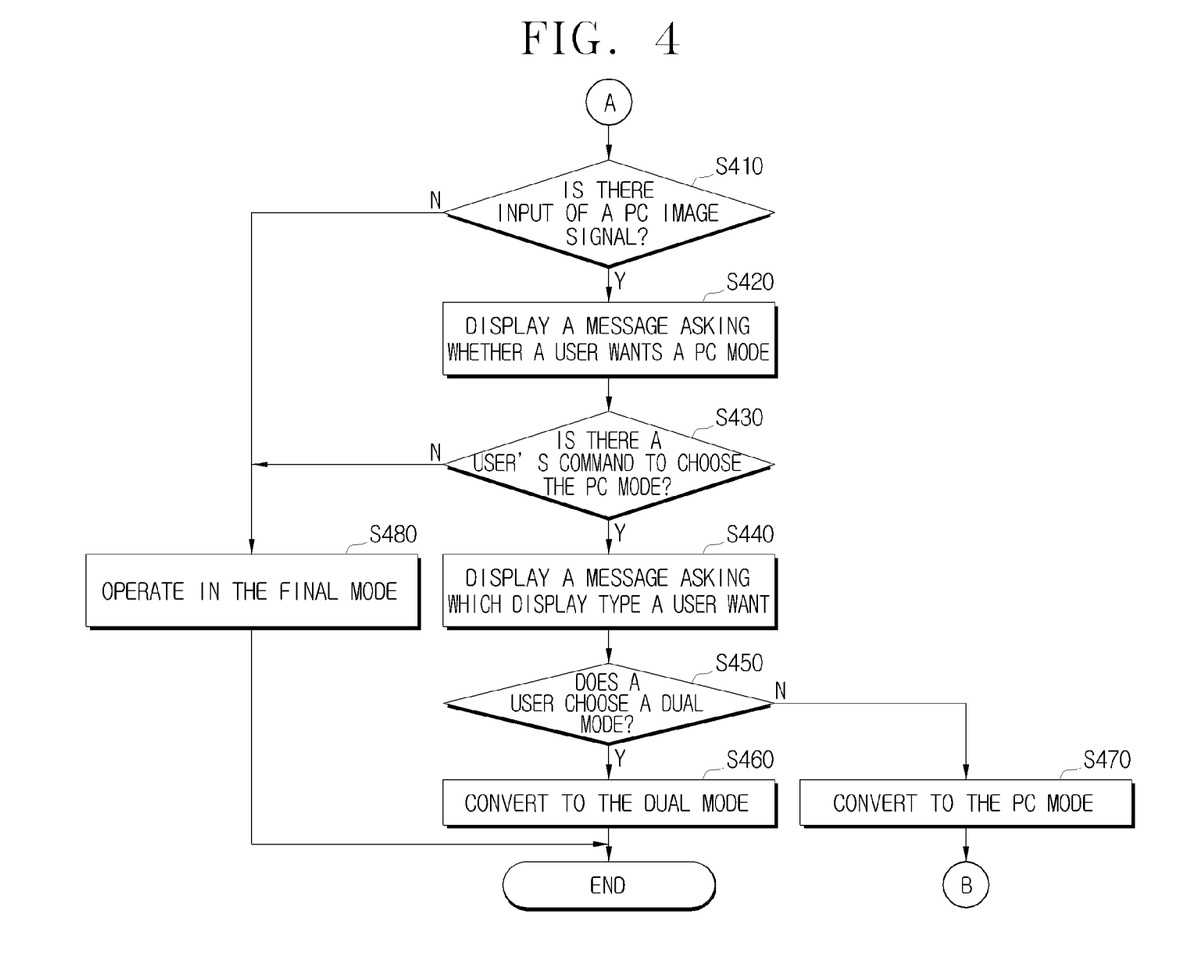
FIG. 4 is a flow chart of operations in case a final mode is not a PC mode in operation 230 of FIG. 2.

FIG. 4 is a flow chart of operations in case a final mode is not a PC mode in operation 230 of FIG. 2.

Referring to FIG. 4, If the final mode is not a PC mode S230-N, the control unit 170 determines whether there is a PC image signal input to the external input unit 120 S410.

Figure 5A:
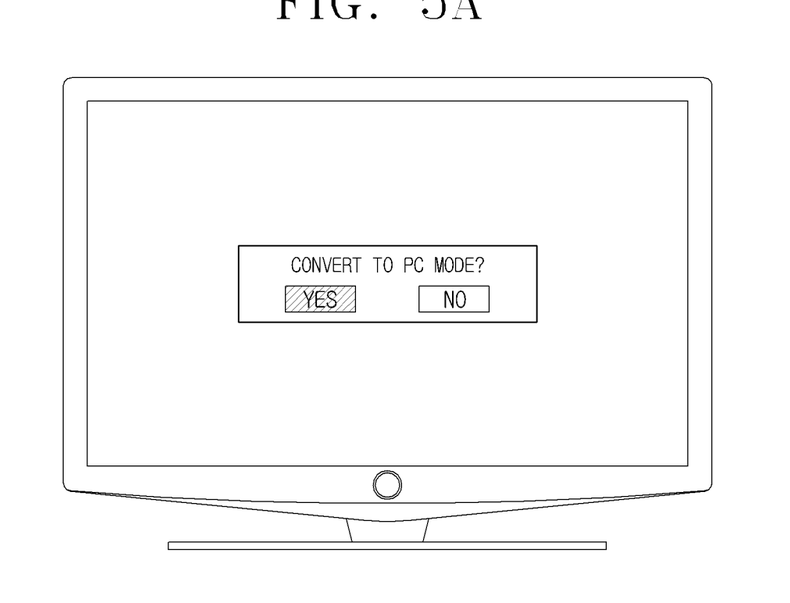
FIG. 5A to 5C are illustrations which show the operations in FIG. 4.

If there is input of a PC image signal S410-Y, the control unit 170 controls the GUI generating unit 140 to generate a message asking whether a user wants a PC mode S420. FIG. 5A illustrates a DTV which display a message asking whether a user wants to convert to a PC mode. A user may indicate whether he chooses a PC mode, by responding to the displayed message.

Figure 5B:
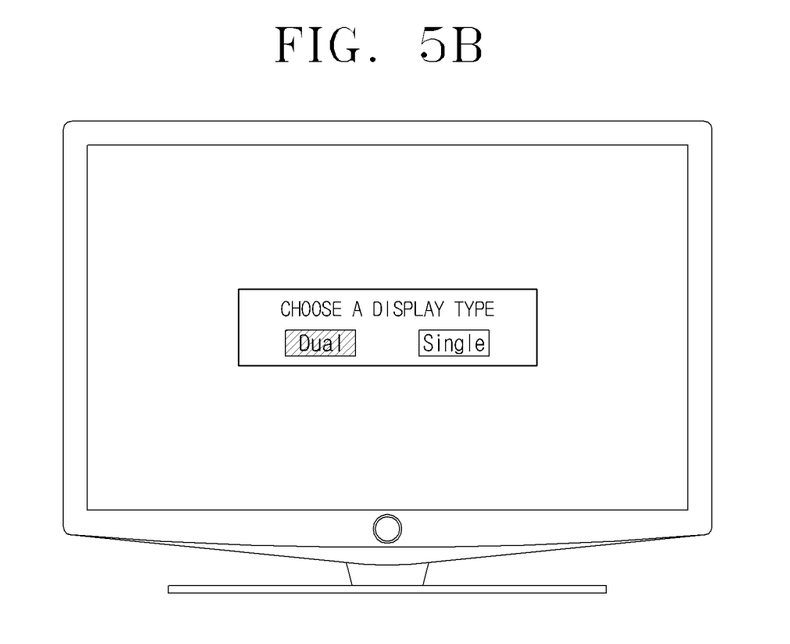

If there is a user command to choose the PC mode S430-Y, the control unit 170 controls the GUI generating unit 140 to display a message asking which display type a user wants S440. FIG. 5B illustrates a DTV which display a message asking which display type a user wants. A user may choose a display type he wants, by responding to the displayed message.

Figure 5C:
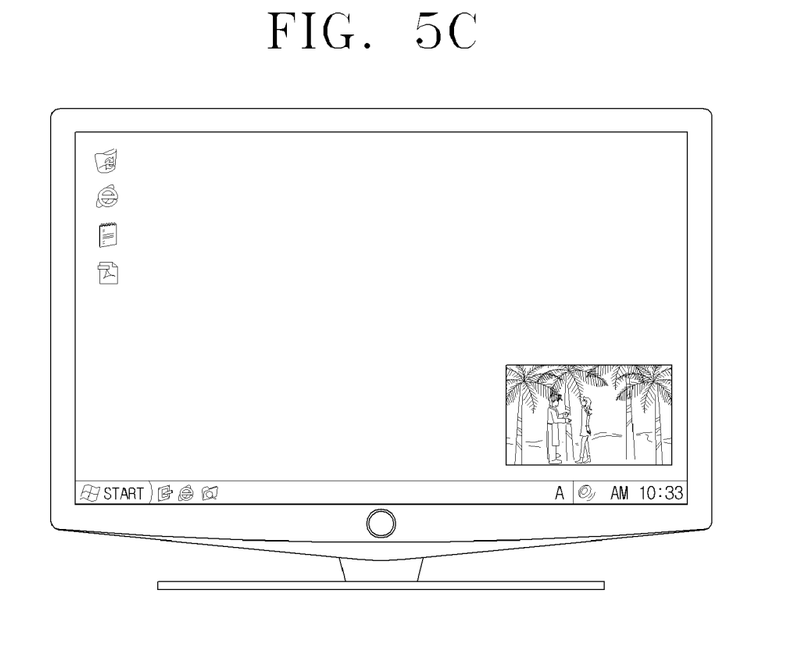

A dual mode is a mode which displays a PC image and the image of the final mode found in the checking operation S220 together. If a user chooses the dual mode S450-Y, the control unit 170 controls the DTV to converts its display type to the dual mode S460. FIG. 5C illustrates a DTV which is converted to the dual mode if the final mode is a TV mode.

If a user chooses a single mode as the display type S450-N, the control unit 170 controls the DTV to convert its mode to the PC mode S470.

If there is no input of a PC image signal in operation S410 (S410-N) or a user does not choose the PC mode S430-N, the control unit 170 controls the DTV to operate in the final mode found in the operation S220 (S480).

Figure 6:
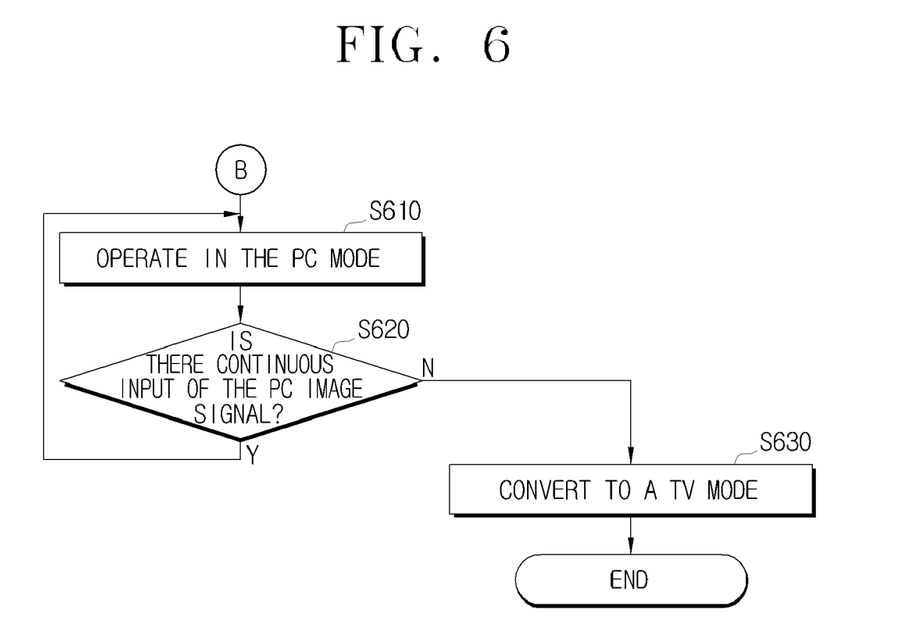
FIG. 6 is a flow chart of the DTV's operations after the DTV converts its mode to the PC mode through the operation S250 of FIG. 2 or the operation S470 of FIG. 4.

FIG. 6 is a flow chart of DTV's operations after the DTV converts its mode to the PC mode through the operation S250 of FIG. 2 or the operation S470 of FIG. 4.

Referring to FIG. 6, during the DTV operation in the PC mode S610, the control unit 170 determines whether there is a continuous input of a PC image signal to the external input unit 120 S620.

If there is a continuous input of a PC image signal S620-Y, the DTV operates the operation S610. But if there no continuous input of a PC image signal S620-N, the control unit 170 controls the DTV to convert its mode to the TV mode S630.

A method for converting a mode automatically depending on whether there is input of a PC image signal and a DTV which performs the method is explained with an exemplary embodiment.

It is explained that a mode is converted depending on whether there is input of a PC image signal in this embodiment, but it is possible that a mode is converted depending on whether there is input of a image signal from a source other than a PC. For example, it is possible to implement a mode which is converted depending on whether there is input of a image signal from a DVD player through the component terminal.

It is explained that the PC is connected to the DTV through the D-sub terminal in this embodiment, but it is possible that the PC is connected to the DTV through the other terminal such as the DVI terminal.

It is possible to implement a mode where the DTV is converted to the PC mode automatically if there is input of the PC image signal during DTV operation in a mode other than the PC mode. The example of the case that there is input of the PC image signal is that the PC which is already turned on, is connected to the DTV or that the PC which is already connected to the DTV, is turned on.

The TV mode in the operation S300 of FIG. 2 and the operation S630 of FIG. 6 may be substituted with other mode than the TV mode and the other mode may be set up by a user. If the DTV does not support the dual mode, it is possible to implement the DTV without the content related to FIG. 4.

Figure 7:
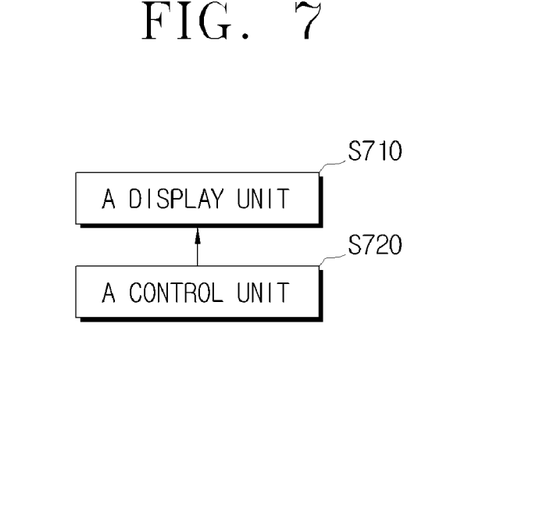
FIG. 7 illustrates a block diagram of a display apparatus according to another exemplary embodiment of the present invention.

FIG. 7 illustrates a block diagram of a display apparatus according to another exemplary embodiment of the present invention.

Referring to FIG. 7, the display apparatus according to the exemplary embodiment comprises a display unit 710 and a control unit 720.

The display unit 710 displays an image. The control unit 720 determines whether there is a continuous input of an image signal from a first source during the display apparatus operation in a first mode in which the image inputted from the first source is displayed on the display unit 710.

If there is no input of an image signal from the first source, the control unit 720 converts its mode to a second mode in which an image inputted from a second source is displayed on the display unit 710.

Figure 8:
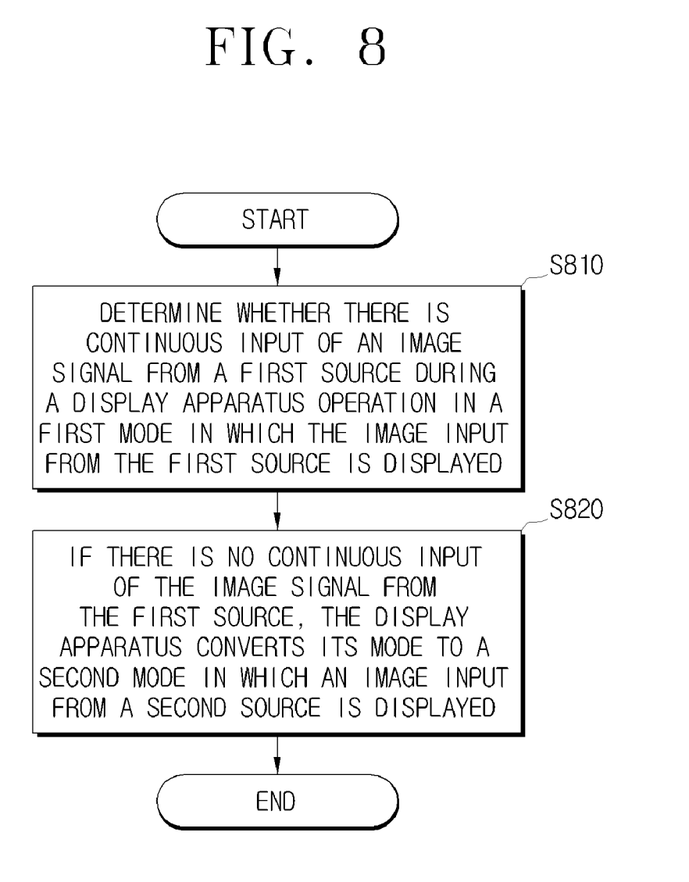
FIG. 8 is a flow chart of a mode conversion method in the display apparatus illustrated in FIG. 7.

FIG. 8 is a flow chart of a mode conversion method in a display apparatus.

Referring to FIG. 8, the display apparatus determines whether there is a continuous input of an image signal from a first source during the display apparatus operation in a first mode in which the image inputted from the first source is displayed S810.

If there is no continuous input of the image signal from the first source, the display apparatus converts its mode to a second mode in which an image inputted from a second source is displayed S820.

Figure 9:
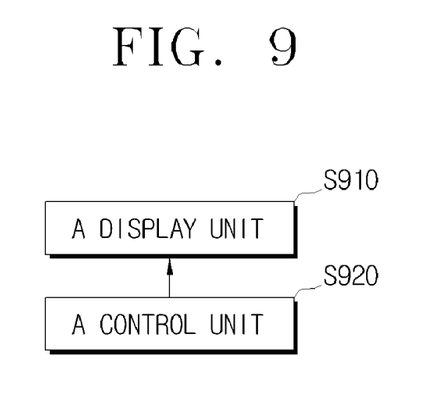
FIG. 9 illustrates a block diagram of a display apparatus according to the other exemplary embodiment of the present invention.

FIG. 9 illustrates a block diagram of a display apparatus according to another exemplary embodiment of the present invention.

Referring to FIG. 9, the display apparatus according to the exemplary embodiment comprises a display unit 910 and a control unit 920.

The display unit 910 displays an image. The control unit 920 determines whether there is input of an image signal from a first source during the display apparatus operation in a second mode in which an image inputted from a second source is displayed on the display unit 910.

If there is input of the image signal from the first source, the control unit 920 converts its mode to a first mode in which an image inputted from the first source is displayed on the display unit 910.

Figure 10:
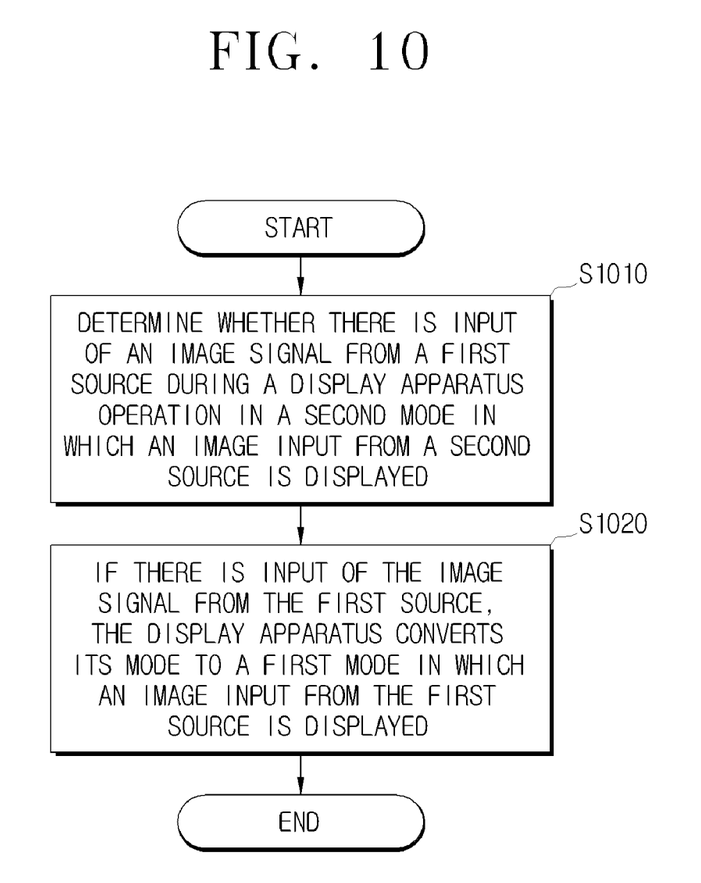
FIG. 10 is a flow chart of a mode conversion method in the display apparatus illustrated in FIG. 9.

FIG. 10 is a flow chart of another mode conversion method in a display apparatus.

Referring to FIG. 10, the display apparatus determines whether there is input of an image signal from a first source during the display apparatus operation in a second mode in which an image inputted from a second source is displayed S1010.

If there is input of the image signal from the first source, the display apparatus converts its mode to a first mode in which an image inputted from the first source is displayed S1020.

Using the above conversion method, it is possible to implement an automatic mode conversion method depending on whether there is input of an image signal and an apparatus performing the conversion method. According to the present invention, it is possible to convert a mode automatically based on the external input status. A user may be provided with two modes conveniently using the conversion method.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A mode conversion method of a display apparatus comprising:
    receiving a first image signal from a first source and displaying a first image of the first image signal received from the first source;
    detecting an abnormal state of reception of the first image signal from the first source; and
    switching from displaying the first image to displaying a second image of a second image signal received from a second source, in response to the detection of the abnormal state of reception of the first image signal,
    wherein the first source is a personal computer (PC) and the abnormal state of reception of the first image signal comprises a state in which the first input signal does not have at least one of a horizontal synchronization signal and a page synchronization signal according to a Display Power Management Signaling (DPMS) function of the PC.

2. The mode conversion method of claim 1, wherein the displaying the second image is performed automatically without a user input to command the displaying the second image.

3. The mode conversion method of claim 1, wherein the second source is one of a source a user selects among image sources and a source providing a broadcasting image signal.

4. The mode conversion method of claim 1, wherein the detecting comprises detecting a continuous receipt of the first image signal.

5. A mode conversion method of a display apparatus comprising:
    receiving a first image signal from a first source and displaying a first image of the first image signal received from the first source;
    determining an abnormal state of reception of the first image signal from the first source according to a Display Power Management Signaling (DPMS) function of a personal computer (PC);
    detecting that a second image signal from a second source is received; and
    switching from displaying the first image to displaying a second image of the second image signal received from the second source, in response to detecting that the second image signal is received.

6. A mode conversion method of a display apparatus comprising:
    receiving a first image signal from a first source and displaying a first image of the first image signal received from the first source;
    determining an abnormal state of reception of the first image signal from the first source according to a Display Power Management Signaling (DPMS) function of a personal computer (PC);
    detecting a receipt of a second image signal from a second source; and
    switching from displaying the first image to displaying the first image and a second image of the second image signal received from the second source together, in response to the detection of the receipt of the second image signal.

7. The mode conversion method of claim 6, wherein the first source is a personal computer (PC).

8. A display apparatus comprising:
    a display unit which displays an image; and
    a control unit which determines that a first image signal from a first source is received, controls the display unit to display a first image of the first image signal as the image displayed on the display unit, detects an abnormal state of reception of the first image signal from the first source, and controls the display unit to switch from displaying the first image to displaying a second image of a second image signal received from a second source as the image displayed on the display unit in response to the detection of the abnormal state of reception of the first image signal, wherein the first source is a personal computer (PC) and the abnormal state of reception of the first image signal comprises a state in which the first input signal does not have at least one of a horizontal synchronization signal and a page synchronization signal according to a Display Power Management Signaling (DPMS) function of the PC.

9. The display apparatus of claim 8, wherein the control unit automatically controls the display unit to switch from displaying the first image to displaying the second image without a user input to command the displaying the second image.

10. The display apparatus of claim 8, wherein the second source is one of a source a user selects among image sources and a source providing a broadcasting image signal.

11. A display apparatus comprising:
a first external input unit which receives a first image signal from a first external source;
a second external input unit which receives a second image signal from a personal computer (PC);
a memory which stores a final mode of the display apparatus at a time when the display apparatus was turned off, the final mode comprising one of a first mode in which the display apparatus receives the first image signal and displays a first image of the first image signal and a PC mode in which the display apparatus receives the second image signal and displays a second image of the second image signal;
a GUI generating unit;
a display unit which displays an image; and
a control unit which, at a time when the display apparatus is turned on, determines whether the final mode is the PC mode, detects whether the second image signal is received from the PC, and controls the display unit to operate in the PC mode in response to determining that the final mode is the PC mode and that the second image signal is received from the PC.

12. The display apparatus of claim 11, wherein the control unit checks whether the first image signal is received from the first external source and controls the GUI generating unit to generate a mode selection list which lists the first external input unit, in response to determining that the final mode is the PC mode and that the second image signal is not received from the PC.

13. The display apparatus of claim 11, wherein the control unit controls the GUI generating unit to generate a message asking whether a user wants a PC mode, in response to determining that the final mode is not the PC mode and that the second image signal is received from the PC.

14. The display apparatus of claim 13, wherein the control unit controls the display unit to operate in the first mode, in response to determining that the final mode is not the PC mode and that the second image signal is not received from the PC or the user provides a negative response to the message.

* * * * *